(12) United States Patent
Liu et al.

(10) Patent No.: US 9,010,315 B2
(45) Date of Patent: *Apr. 21, 2015

(54) SOLAR COLLECTOR BASED ON CARBON NANOTUBES AND SOLAR HEATING SYSTEM USING THE SAME

(75) Inventors: Peng Liu, Beijing (CN); Pi-Jin Chen, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1033 days.

This patent is subject to a terminal disclaimer.

(21) Appl. No.: 12/381,611

(22) Filed: Mar. 12, 2009

(65) Prior Publication Data

US 2009/0266356 A1  Oct. 29, 2009

(30) Foreign Application Priority Data

Apr. 11, 2008 (CN) .......................... 200810066576.2

(51) Int. Cl.
*F24J 2/24* (2006.01)
*F24J 2/48* (2006.01)
*F24J 2/52* (2006.01)

(52) U.S. Cl.
CPC .......... *F24J 2/485* (2013.01); *F24J 2002/5275* (2013.01); *Y02E 10/40* (2013.01)

(58) Field of Classification Search
USPC ......................................... 126/569, 617, 624
See application file for complete search history.

(56) References Cited

U.S. PATENT DOCUMENTS

| 4,132,219 | A | * | 1/1979 | Cohen et al. | ................ | 126/694 |
| 4,133,298 | A | * | 1/1979 | Hayama | ................ | 126/591 |
| 4,149,525 | A | * | 4/1979 | Prado | ................ | 126/654 |
| 4,159,706 | A |   | 7/1979 | Mahdjuri | | |
| 4,273,098 | A | * | 6/1981 | Silverstein | ................ | 126/661 |
| 4,378,789 | A | * | 4/1983 | Vironneau | ................ | 126/654 |
| 4,822,120 | A |   | 4/1989 | Fan et al. | | |

(Continued)

FOREIGN PATENT DOCUMENTS

| CN | 2302262 | | 12/1998 |
| CN | 2457521 | Y | 10/2001 |

(Continued)

OTHER PUBLICATIONS

Xiao-gang Sun, "Investigation on Radar Absorbing Properties of Carbon Nanotube", Journal of Synthetic Crystals, Feb. 2005, vol. 34, No. 1, p. 174-177 (Wherein, abstract maybe relevant).

(Continued)

*Primary Examiner* — Linda Dvorak
*Assistant Examiner* — Daniel Fowler
(74) *Attorney, Agent, or Firm* — Novak Druce Connolly Bove + Quigg LLP

(57) ABSTRACT

A solar collector includes a substrate having a top surface and a bottom surface opposite to the upper surface, a sidewall, a transparent cover, and a heat-absorbing layer. The sidewall is arranged on the periphery of the top surface of the substrate. The transparent cover is disposed on the sidewall opposite to the substrate to form a sealed chamber. The heat-absorbing layer is disposed on the upper surface of the substrate and includes a carbon nanotube film having a plurality of carbon nanotubes. The carbon nanotubes in the carbon nanotube film are joined end-to-end.

20 Claims, 5 Drawing Sheets

(56) References Cited

U.S. PATENT DOCUMENTS

| | | | |
|---|---|---|---|
| 6,067,982 A * | 5/2000 | Harrison | 126/571 |
| 6,863,942 B2 * | 3/2005 | Ren et al. | 428/36.9 |
| 7,183,003 B2 | 2/2007 | Leu et al. | |
| 7,354,877 B2 * | 4/2008 | Rosenberger et al. | 442/194 |
| 7,608,293 B2 | 10/2009 | Huang et al. | |
| 2005/0002849 A1 | 1/2005 | Mitsui et al. | |
| 2005/0069701 A1 | 3/2005 | Watanabe et al. | |
| 2005/0095938 A1 | 5/2005 | Rosenberger et al. | |
| 2006/0048808 A1 | 3/2006 | Ruckman et al. | |
| 2007/051965 A1 | 3/2007 | Du et al. | |
| 2008/0049380 A1 | 2/2008 | Miyahara et al. | |
| 2008/0178920 A1 | 7/2008 | Ullo | |
| 2008/0248235 A1 | 10/2008 | Feng et al. | |
| 2010/0236543 A1 | 9/2010 | Oetting et al. | |

FOREIGN PATENT DOCUMENTS

| | | |
|---|---|---|
| CN | 2486079 | 4/2002 |
| CN | 1474113 | 2/2004 |
| CN | 2641536 Y | 9/2004 |
| CN | 201014777 Y | 1/2008 |
| CN | 101239712 | 8/2008 |
| DE | 19704323 | 7/1998 |
| EP | 1529857 | 5/2005 |
| JP | 52-116942 | 9/1977 |
| JP | 57-92654 | 6/1982 |
| JP | 58-52932 | 3/1983 |
| JP | S58-52932 | 3/1983 |
| JP | 62-59342 | 3/1987 |
| JP | 5-79708 | 3/1993 |
| JP | 2001-226108 | 8/2001 |
| JP | 2003-160322 | 6/2003 |
| JP | 2004-211718 | 7/2004 |
| JP | 2005-96055 | 4/2005 |
| JP | 2005-199666 | 7/2005 |
| JP | 2005199666 | 7/2005 |
| JP | 2006-1820 | 1/2006 |
| JP | 2006114826 | 4/2006 |
| JP | 2006-229168 | 8/2006 |
| JP | 2006-265079 | 10/2006 |
| JP | 2007-27088 | 2/2007 |
| JP | 2007-183252 | 7/2007 |
| JP | 2008-44820 | 2/2008 |
| JP | 2009-141079 | 6/2009 |
| WO | WO2007015670 | 2/2007 |
| WO | WO 2007015710 A2 * | 2/2007 |

OTHER PUBLICATIONS

Liang Jintao, Liu Junhua, Optimization of a IR detector of Microcantilever with Carbon Nanometer Tube, ACTA Optica Sinica, Nov. 2004, pp. 1547-1551, vol. 24 No. 11.

* cited by examiner

SOLAR COLLECTOR BASED ON CARBON NANOTUBES AND SOLAR HEATING SYSTEM USING THE SAME

This application is related to applications entitled, "SOLAR COLLECTOR AND SOLAR HEATING SYSTEM USING SAME", filed on Mar. 12, 2009, Ser. No. 12/381,551; "SOLAR COLLECTOR AND SOLAR HEATING SYSTEM USING SAME", filed on Mar. 12, 2009, Ser. No. 12/381,577; "SOLAR COLLECTOR AND SOLAR HEATING SYSTEM USING SAME", filed on Mar. 12, 2009, Ser. No. 12/381,578; AND "SOLAR COLLECTOR AND SOLAR HEATING SYSTEM USING SAME", filed on Mar. 12, 2009, Ser. No. 12/381,579. The disclosures of the above-identified applications are incorporated herein by reference.

BACKGROUND

1. Technical Field

The present disclosure relates to a solar collector and, particularly, to a carbon nanotube incorporating solar collector.

2. Description of Related Art

Generally, solar collectors can be divided into two typical types: pipe solar collectors and flat plate solar collectors. For many applications, it has been demonstrated that the most efficient and least expensive type of solar collector is the flat plate collector. Referring to FIG. 5, a typical flat plate collector 500, according to the prior art, includes a substrate 52, a sidewall 56 arranged on the periphery of the substrate 52, and a transparent cover 50 fixed on the sidewall 56 opposite to the substrate 52. A sealed chamber is formed between the substrate 52 and the transparent cover 50. A number of supporters 58 are dispersed in the sealed chamber 60 at random. The transparent cover 50 is used for passage of light and is made of glass, plastic and other transparent materials. The substrate 52 is made of absorbing materials, such as copper, aluminum, or the likes. In use, the light enters the collector 500 through the cover 50, and is absorbed by the substrate 52. Thus, heat is generated by the substrate 52 and is transferred to a storage apparatus (not shown).

Actually, the traditional thin films made of absorbing materials have very high absorbing efficiency. The traditional solar collector 500 can't adopt the thin film technology because the film is difficult to evaporate on the large area substrate. As such, the heat absorbing efficiency of the solar collector 500 is limited by the material it used. Therefore, the efficiency of the collector 500 is limited accordingly.

What is needed, therefore, is to provide a solar collector and a solar heating system using the solar collector that can overcome the above-described shortcomings.

BRIEF DESCRIPTION OF THE DRAWINGS

Many aspects of the present solar collector and solar heating system can be better understood with references to the following drawings. The components in the drawings are not necessarily drawn to scale, the emphasis instead being placed upon clearly illustrating the principles of the present solar collector.

Figure 1:
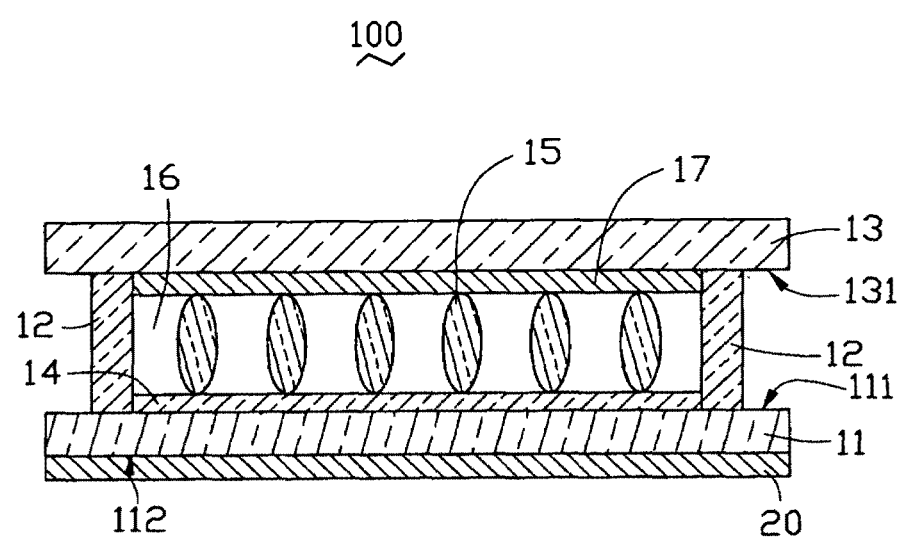
FIG. 1 is a schematic, side view of a solar heating system having a carbon nanotube film in accordance with the present embodiment.

Corresponding reference characters indicate corresponding parts throughout the several views. The exemplifications set out herein illustrate at least one embodiment of the solar collector, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the solar collector.

Figure 2:
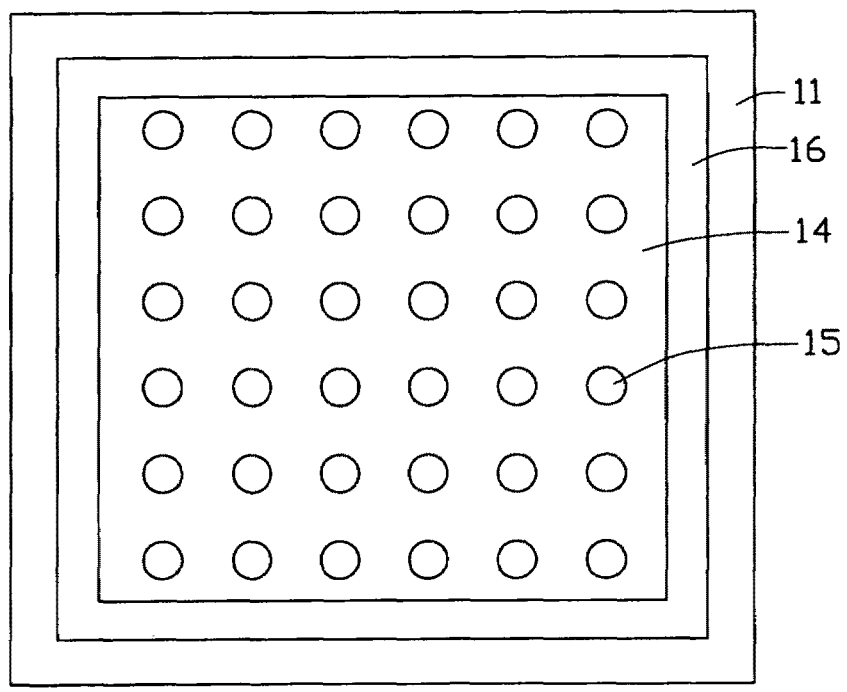
FIG. 2 is a schematic, top view of a solar heating system of FIG. 1.

Referring to FIGS. 1-2, a solar-heating system 100 according to the present embodiment is shown. The solar-heating system 100 includes a solar collector 10 and a storage apparatus 20 connected to the solar collector 10. The storage apparatus 20 is configured for storing heat generated by the solar collector 10.

The solar collector 10 includes a substrate 11, a sidewall 12, a transparent cover 13, a heat-absorbing layer 14 and a number of supporters 15. The substrate 11 has a top surface 111 and a bottom surface 112 opposite to the top surface 111. The transparent cover 13 has a bottom surface 131. The sidewall 12 is mounted on the periphery of the top surface 11 of the substrate 11. The transparent cover 13 is attached on the sidewall 12 opposite to the substrate 11 to form a sealed chamber 16 in cooperation with the sidewall 12 and the substrate 11. The heat-absorbing layer 14 is disposed on the top surface 11 of the substrate 11 and received in the sealed chamber 16.

The material of the substrate 11 can be selected from one of heat-conducting materials, such as metal, glass, polymer, and so on. A thickness of the substrate 11 is in a range from about 100 μm to about 5 mm. The shape of the substrate 11 is not limited; and may be triangular, hexagonal, and so on.

The transparent cover 13 may be a solar radiation access window. The material of the transparent cover 13 can be selected from a group consisting of glass, plastic, transparent porcelain, polymer and other transparent materials. A thickness of the transparent cover 13 is in a range from about 100 μm to about 5 mm. The shape of the transparent cover 13 is not limited, and may be triangle, hexagon, quadrangle, and so on.

The sidewall 12 is configured for supporting the transparent cover 13, and thereby forming the sealed chamber 16 between the transparent cover 13 and the substrate 11. The sidewall 12 can be made of materials selected from glass, plastics, polymers, and the like. A height of the sidewall 12 is not limited. A thickness of the sidewall 12 can be in a range from about 100 μm to about 500 μm. In the present embodiment, the range is about 150 μm to about 250 μm.

The sealed chamber 16 may be a vacuum chamber or an atmospheric chamber filled with transparent thermal-insulating materials. In the present embodiment, the sealed chamber 16 can be an atmospheric chamber, and the thermal-insulating materials filled therein can be transparent foam materials, such as transparent foam rubber, transparent foam plastics, or the like. The sealed chamber 16 can also be filled with thermal-insulating gas such as nitrogen and inert gases.

Figure 3:
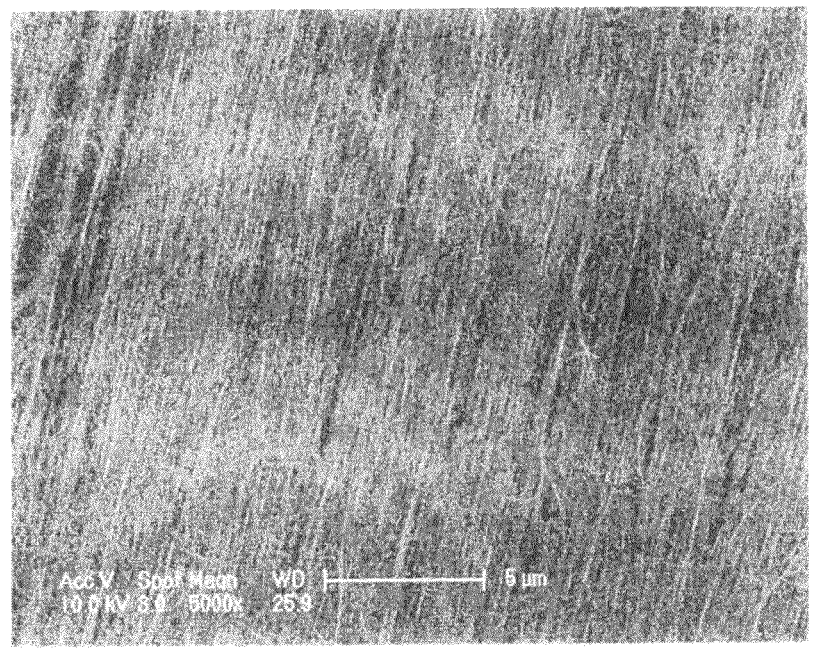
FIG. 3 is a Scanning Electron Microscope (SEM) image of the carbon nanotube film of FIG. 1.
Figure 4:
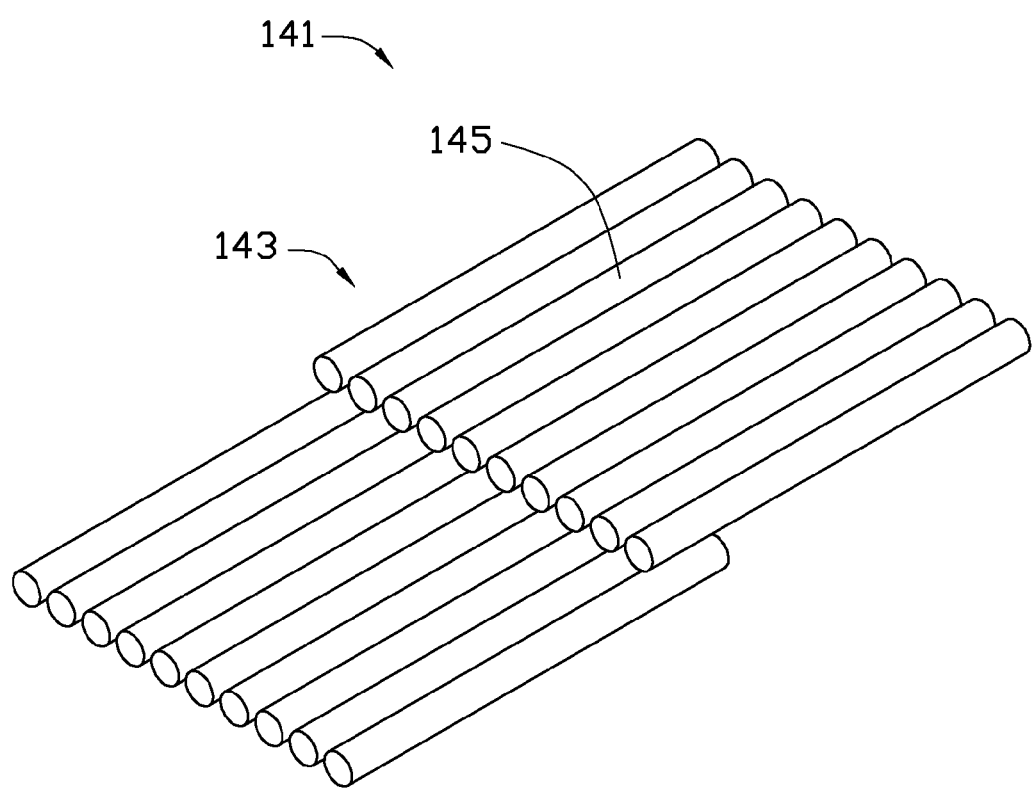
FIG. 4 is a structural schematic of a carbon nanotube segment.
Figure 5:
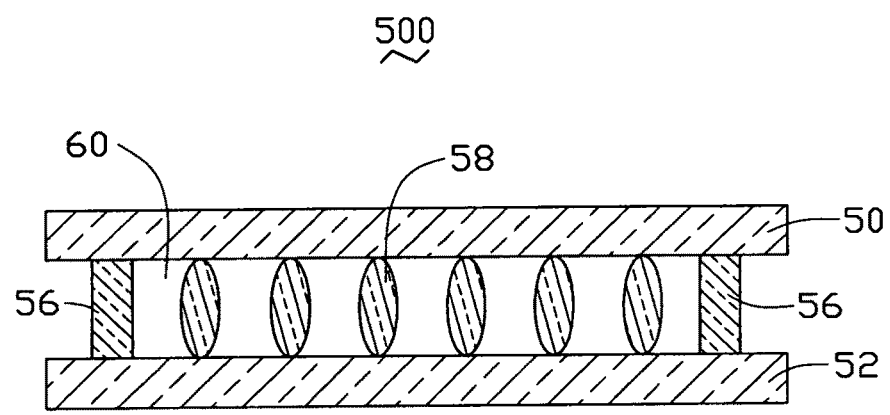
FIG. 5 is a schematic view of a typical solar collector according to the prior art.

The heat-absorbing layer 14 includes at least one carbon nanotube film 141. The thickness of the heat-absorbing layer 14 is not limited. In the present embodiment, the thickness of the heat-absorbing layer 14 is in a range from about 3 μm to about 2 mm. Referring to FIG. 3, the carbon nanotube film 141 includes a plurality of successive carbon nanotubes joined end to end and are aligned substantially in the same direction. The majority of carbon nanotubes are arranged along a primary direction. However, the orientation of some of the nanotubes may vary. Referring to FIG. 4, the carbon nanotube film 141 includes a plurality of successively oriented carbon nanotube segments 143 joined end-to-end by van der Waals attractive force therebetween. Each carbon nanotube segment 143 includes a plurality of carbon nanotubes 145 arranged side by side, and combined by van der Waals attractive force therebetween. The carbon nanotube segments 143 can vary in width, thickness, uniformity and shape. The carbon nanotubes 145 in the carbon nanotube segment 143 are also oriented along a preferred orientation.

The carbon nanotube film 141 is drawn from a carbon nanotube array. The drawn carbon nanotubes are combined by van der Waals attractive force. The carbon nanotube film 141 is adhesive because the carbon nanotubes have relatively large specific areas. The thickness of the carbon nanotube film 141 ranges from about 0.5 nm to about 100 μm. When the heat-absorbing layer 14 includes at least two carbon nanotube films 141, the carbon nanotube films 141 can be stacked. An angle α between the aligned directions of stacked carbon nanotubes in two adjacent carbon nanotube films 141 is in a range of $0° \leq \alpha \leq 90°$.

The carbon nanotubes of the carbon nanotube film 141 can be selected from a group comprising single-walled carbon nanotubes (SWCNT), double-walled carbon nanotubes (DWCNT), multi-walled carbon nanotubes (MWCNT), and their mixture. A diameter of the carbon nanotubes ranges from about 0.5 to about 50 nm. A length of the carbon nanotubes is larger than about 10 μm. The carbon nanotubes in the present embodiment each have a length of about 100 μm to about 1 mm.

The supporters 15 are configured for increasing the strength of the solar collector 10. The supporters 15 are dispersed in the sealed chamber 16 randomly or in a desired pattern. The supporters 15 are spaced from each other and disposed between the substrate 11 and the transparent cover 13. The supporters 15 can be made of thermal-insulating materials, such as glass, plastics, rubber, and so on. A height of the supporters 15 is the same as that of the sidewall 12 for contacting with the transparent cover 13. The shape of the supporters 15 is not limited, and may be, for example, rounded or bar-shaped.

The solar collector 10 further includes a reflection layer 17. The reflection layer 17 is disposed on the bottom surface 131 of the transparent cover 13. The reflection layer 17 is configured for allowing visible light and near infrared light of the sunlight passing through the transparent cover 13 and reflecting the far infrared light radiated from the heat-absorbing layer 14 to prevent thermal radiation from escaping the sealed chamber 16. Thus, the light absorbing efficiency of the solar collector 10 is improved. The reflection layer 17 may be an indium tin oxide (ITO) film or a titanium dioxide film and a thickness of the reflection layer 17 can range from about 10 nm to about 1 μm.

The storage apparatus 20 is located on a bottom surface 112 of the substrate 11 and may include a number of pipes (not shown) filled with circulating fluid. The fluid may be selected from the group of water, glycol, or the like.

In use, since the carbon nanotube film is black and has a capability of absorbing solar spectrum. The sunlight travels through the transparent cover 13 and reaches the heat-absorbing layer 14. A good portion of the radiation of the sunlight is absorbed by the heat-absorbing layer 14. Then, the heat absorbed by the heat-absorbing layer 14 is conducted to the storage apparatus 20 via the substrate 11. Therefore, the solar collector 10 has a high efficiency because of the excellent light absorbing properties of the carbon nanotubes of the heat-absorbing layer 14. The solar collector 10 is durable due to the toughness of the carbon nanotubes in the carbon nanotube film. Since carbon nanotubes do not oxidized easily, a high vacuum surrounding is not necessary for making the solar collector 10. Thus the cost of the solar collector 10 is relatively low when compared to the prior art.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:
1. A solar collector comprising:
a substrate comprising a top surface, a material of the substrate being a heat conducting material;
a sidewall disposed on the substrate;
a transparent cover comprising a bottom surface and disposed on the sidewall, wherein the substrate, the sidewall and the transparent cover form a sealed chamber, wherein the sealed chamber is an atmospheric chamber filled with one or more inert gases;
a heat-absorbing layer disposed on the top surface of the substrate, the heat-absorbing layer comprising a carbon nanotube film comprising a plurality of carbon nanotube segments joined end-to-end; and
a reflection layer located on the bottom surface of the transparent cover and directly opposite to the heat-absorbing layer.
2. The solar collector as claimed in claim 1, wherein the carbon nanotube segments are distributed uniformly.
3. The solar collector as claimed in claim 1, wherein the majority of carbon nanotube segments are arranged along a primary direction.
4. The solar collector as claimed in claim 1, wherein the plurality of carbon nanotube segments are successively oriented and joined end-to-end by van der Waals attractive force therebetween.
5. The solar collector as claimed in claim 4, wherein the carbon nanotube segment comprises a plurality of the carbon nanotubes arranged side by side and combined by van der Waals attractive force therebetween.
6. The solar collector as claimed in claim 1, wherein a thickness of the carbon nanotube film is in a range from about 0.5 nm to about 100 μm.
7. The solar collector as claimed in claim 1, wherein a thickness of the reflection layer is in a range from about 10 nm to about 1 μm.
8. The solar collector as claimed in claim 1, wherein the reflection layer comprises an indium tin oxide film or a titanium dioxide film.
9. The solar collector as claimed in claim 1, wherein a thickness of the transparent cover is in a range from about 100 μm to about 5 mm.
10. The solar collector as claimed in claim 9, wherein a thickness of the substrate is in a range from about 100 μm to about 5 mm.
11. The solar collector as claimed in claim 1, wherein a thickness of the sidewall is in a range from about 100 μm to about 500 μm.

12. The solar collector as claimed in claim 1, further comprising a plurality of supporters spaced from each other and disposed between the substrate and the transparent cover.

13. The solar collector as claimed in claim 1, wherein the sidewall is made of glass.

14. A solar-heating system comprising:
   a solar collector comprising:
      a substrate comprising a top surface and a bottom surface opposite the top surface, a material of the substrate being a heat-conducting material;
      a sidewall;
      a transparent cover comprising a bottom surface and disposed on the sidewall, wherein the substrate, the sidewall and the transparent cover are connected with each other to form a sealed chamber, wherein the sealed chamber is a vacuum chamber;
      a heat-absorbing layer disposed on the top surface of the substrate, the heat-absorbing layer comprising a carbon nanotube film comprising a plurality of carbon nanotube segments joined end-to-end; and
      a reflection layer located on the bottom surface of the transparent cover and directly opposite to the heat-absorbing layer; and
   a heat storage apparatus located outside the sealed chamber and directly contacting the bottom surface of the substrate and configured for storing heat generated by the heat-absorbing layer.

15. The solar-heating system as claimed in claim 14, wherein the substrate is adapted to conduct heat absorbed by the heat-absorbing layer to the storage apparatus.

16. The solar-heating system as claimed in claim 14, wherein the majority of carbon nanotube segments are arranged along a primary direction, and each carbon nanotube segment comprises a plurality of the carbon nanotubes arranged side by side and combined by van der Waals attractive force therebetween.

17. The solar-heating system as claimed in claim 16, wherein the plurality of carbon nanotube segments are successively oriented and joined end-to-end by van der Waals attractive force therebetween.

18. The solar-heating system as claimed in claim 14, wherein a thickness of the reflection layer is in a range from about 10 nm to about 1 μm, and the reflection layer comprises an indium tin oxide film or a titanium dioxide film.

19. The solar collector as claimed in claim 14, wherein a thickness of the substrate is in a range from about 100 μm to about 5 mm.

20. The solar-heating system as claimed in claim 14, wherein a thickness of the sidewall is in a range from about 100 μm to about 500 μm.

\* \* \* \* \*